(12) United States Patent
Um et al.

(10) Patent No.: US 6,687,271 B2
(45) Date of Patent: Feb. 3, 2004

(54) HIGH POWERED LASER

(75) Inventors: Kee Tae Um, Kunpo (KR); Han Bae Lee, Songnam (KR); Ki Young Um, Koyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/157,852

(22) Filed: May 31, 2002

(65) Prior Publication Data

US 2002/0186731 A1 Dec. 12, 2002

(30) Foreign Application Priority Data

Jun. 11, 2001 (KR) .................... P2001-0032522

(51) Int. Cl.[7] ................................ H01S 3/04
(52) U.S. Cl. ........................................ 372/36
(58) Field of Search ....................... 372/36, 34

(56) References Cited

U.S. PATENT DOCUMENTS 5,835,515 A * 11/1998 Huang ................... 372/36
6,428,307 B1 * 8/2002 Early et al. ............... 431/1

* cited by examiner

*Primary Examiner*—Paul Ip
*Assistant Examiner*—James Menefee
(74) *Attorney, Agent, or Firm*—Birch, Stewart, Kolasch & Birch, LLP

(57) ABSTRACT

High powered laser including a microchip laser array having an array of microchip laser beam shooting parts, and a heat transfer member of a material with a high thermal conductivity fitted between, and in contact with, the microchip laser beam shooting parts, for transferring heat from the microchip laser beam shooting parts to the outside of the high powered laser, thereby enhancing an output.

10 Claims, 6 Drawing Sheets

HIGH POWERED LASER

This application claims the benefit of the Korean Application No. P2001-0032522 filed on Jun. 11, 2001, which is hereby incorporated by reference.

BACKGROUND OF THE INVENTION

1. Field of the Invention

The present invention relates to a laser, and more particularly, to a high powered laser, in which an array of micro-chip lasers is provided and a cooling system of the array is improved for enhancing an output.

2. Background of the Related Art

A laser beam is obtained by exciting a material containing atoms of a high energy level placed between two reflectors, to repeat reflection of light emitted by the excitation between the two reflectors enough to stimulate emission. The laser beam is a coherent monochromic light with characteristics like an electronic wave. Utilizing those characteristics, the laser beam is used in various fields, such as space communication, precision machining, medical treatment, and physical property study.

Depending on the materials that cause the stimulated emission, lasers are classified into gas lasers, solid state lasers, semiconductor lasers, dye lasers, and the like. FIG. 1 illustrates a related art DPSS (Diode Pumped Solid State) laser, schematically.

Referring to FIG. 1, the related art DPSS laser is provided with a laser diode array (LD array) 11 used as a pumping light source, a focusing optical system 12, a first reflector 13, a laser medium 14, a second reflector 15, and a nonlinear optical material 16.

The DPSS laser shoots the laser beam by directing a light from the laser diode array 11 to the laser medium 14 for pumping the light, and amplifying the pumped light. The DPSS laser provides high power considering its small size in comparison to an existing solid state, or liquid laser, of which application is increasing significantly.

Particularly, the laser with the laser medium 14 and the nonlinear material 16 joined together is called as a microchip laser, which is shown in FIGS. 2–3B.

Referring to FIG. 2, LD array 11 and focusing optical system 22 are shown. The microchip laser 20 has the laser medium 24 and the nonlinear material 26 joined together. A reflector 23 or 25 is coated on a surface of the laser medium 24 or the nonlinear material, to form a resonator 27.

The resonator 27 has a first reflector 23 and a second reflector 25 coated on opposite surfaces of the laser medium 24 as one form, and the first reflector 23 coated on a surface of the laser medium 24 and the second reflector 25 coated on a surface of the nonlinear material as the other form, which are best shown in FIGS. 3A–3B.

Operation of the related art microchip laser will be explained, briefly.

A light $\lambda_0$ from the laser diode array 21 is incident to, and pumped at, the laser medium 24, and emitted therefrom in a light of a particular wavelength $\lambda_1$. Then, the light $\lambda_1$ is amplified, and shoots as the light $\lambda_1$ goes back and forth repeatedly within the resonator 27. In this process, the light $\lambda_1$ is turned into a light with a wavelength $\lambda_2$ one half of a natural frequency by second harmonic generation of the nonlinear material 26.

The microchip laser has advantages in that a length thereof can be reduced since the laser medium 24 and the nonlinear material 26 are joined, and a size thereof can be made smaller since the resonator 27 is formed by coating the reflectors 23 and 25 on surfaces of the laser medium 24 and the nonlinear material 26.

In the meantime, a plurality of microchip lasers 20 may be arranged on more than one line to fabricate one laser for providing a high powered laser beam, of which temperature gradient is best shown in FIG. 4.

Referring to FIGS. 4A and 4B, 'A', 'B', 'C', and 'D' regions represents regions of the same temperatures, wherein it can be noted that the temperature becomes lower as it goes the farther away from the pumping light focus part, and there is heat transfer between adjacent microchip lasers 20.

In this instance, a desired power may not be obtainable due to the heat transfer between the adjacent microchip lasers 20, or, when excessive, the shooting of the laser beam is not possible. That is, when the power of the laser diode array 21 is made higher for shooting a high powered laser beam, the laser medium 24 and the nonlinear material 26 cause a thermal lens effect in which a light is refracted by heat. Moreover, the heat transfer between adjacent microchip lasers 20 makes the thermal lens effect greater.

In summary, the microchip laser array has a disadvantage in that a power higher than a certain limit can not be provided due to the thermal lens effect even if a high powered pumping light is incident thereto.

SUMMARY OF THE INVENTION

Accordingly, the present invention is directed to a high powered laser that substantially obviates one or more of the problems due to limitations and disadvantages of the related art.

An object of the present invention is to provide a high powered laser, in which an array of micro-chip lasers is provided and a cooling system of the array is improved for enhancing an output.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the high powered laser includes a microchip laser array having an array of microchip laser beam shooting parts, and a heat transfer member of a material with a high thermal conductivity fitted between, and in contact with, the microchip laser beam shooting parts, for transferring heat from the microchip laser beam shooting parts to outside of the high powered laser.

The high powered laser further includes a cooling member fitted in contact with the heat transfer member for forcible cooling of the heat transferred to the heat transfer member by water or air.

In another aspect of the present invention, there is provided a high powered laser including a microchip laser array having an array of microchip laser beam shooting parts, a heat transfer member of a material with a high thermal conductivity fitted between, and in contact with, the microchip laser beam shooting parts, for transferring heat from the microchip laser beam shooting parts to outside of the high powered laser, a cooling member fitted in contact with the heat transfer member for forcible cooling of the heat transferred to the heat transfer member by water or air, and focusing means fitted to an output end of the microchip laser array for focusing lights from the microchip laser beam shooting parts into a single laser beam.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. In explaining the present invention, the same parts will be given the same names and reference symbols, and iterative explanations of which will be omitted.

Figure 5A:
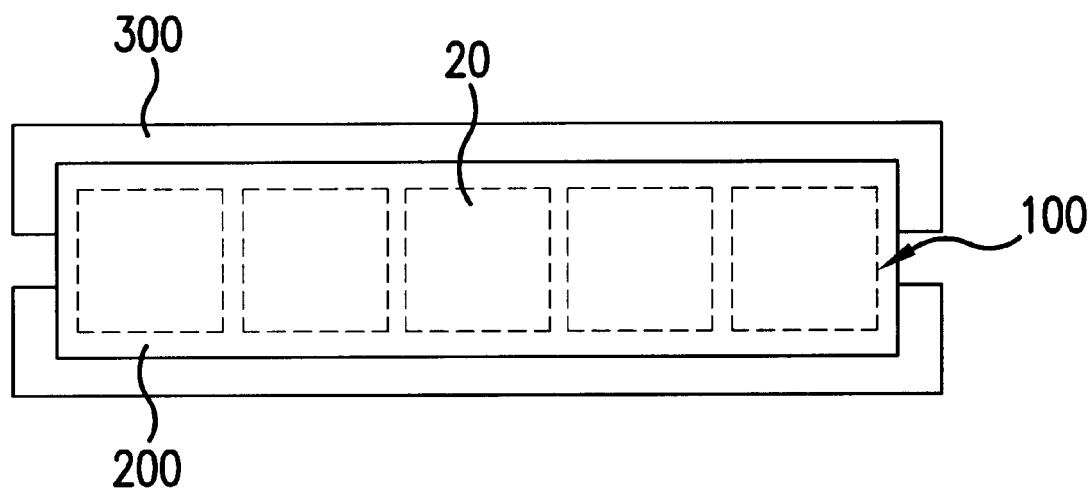
FIGS. 5A and 5B illustrate a high powered laser in accordance with one preferred embodiment of the present invention, schematically.
Figure 5B:
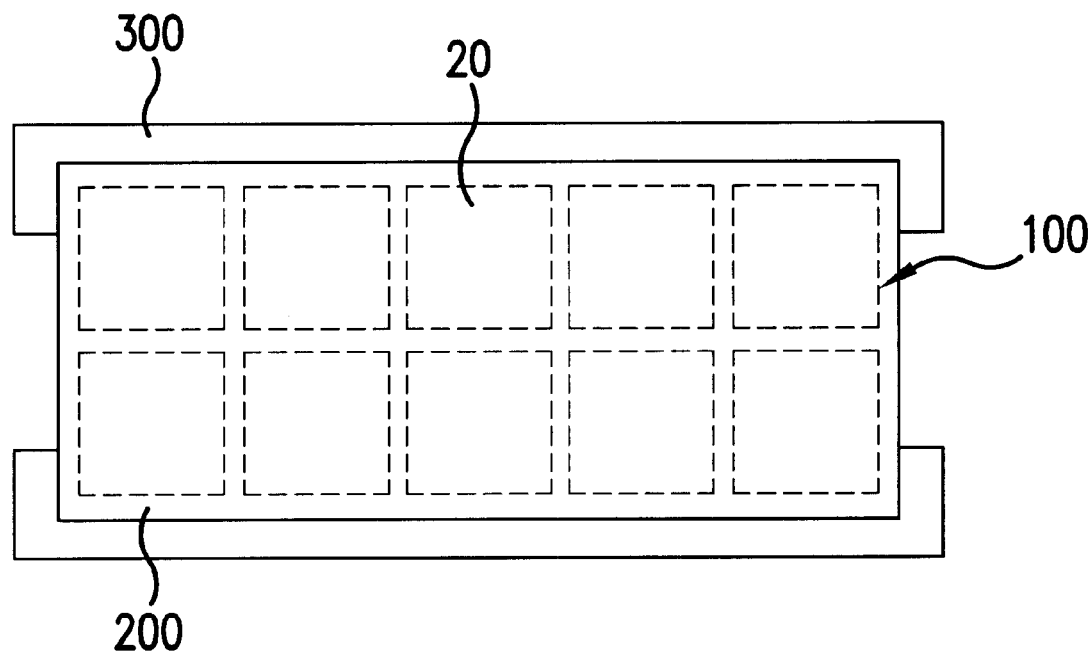

FIGS. 5A and 5B illurate a high powered laser in accordance with one preferred embodiment of the present invention, schematically.

Referring to FIGS. 5A and 5B, the high powered laser includes a microchip array 100 having an array of microchip laser beam shooting parts 20, and a heat transfer member 200 between the microchip laser beam shooting parts 20.

Figure 1:
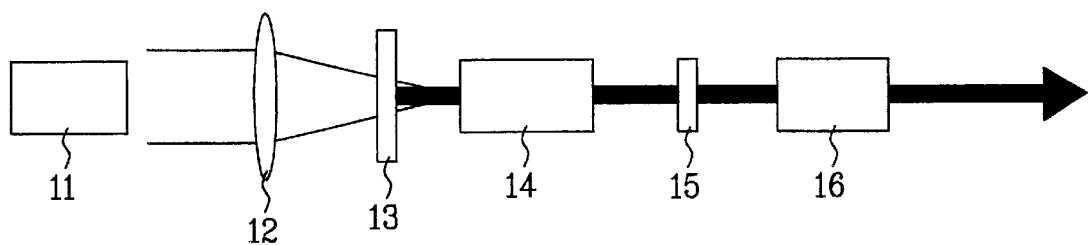
FIG. 1 illustrates a related art DPSS laser, schematically.
Figure 2:
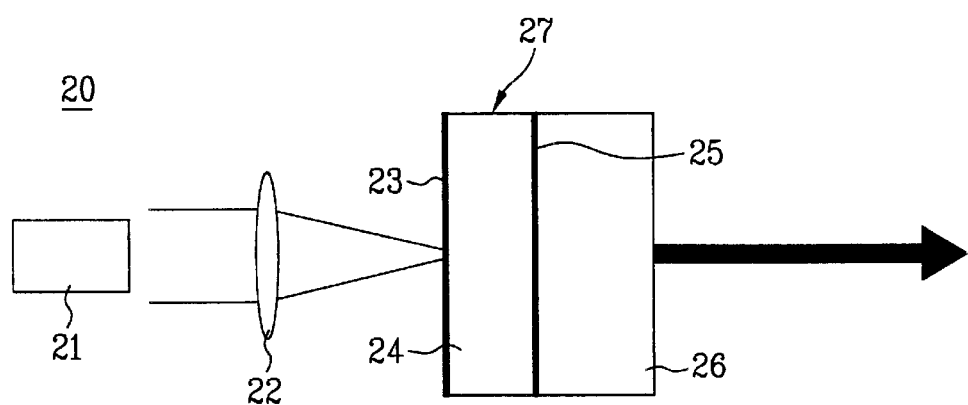
FIG. 2 illustrates a microchip laser system in the related art DPSS laser in FIG. 1, schematically.
Figure 3A:
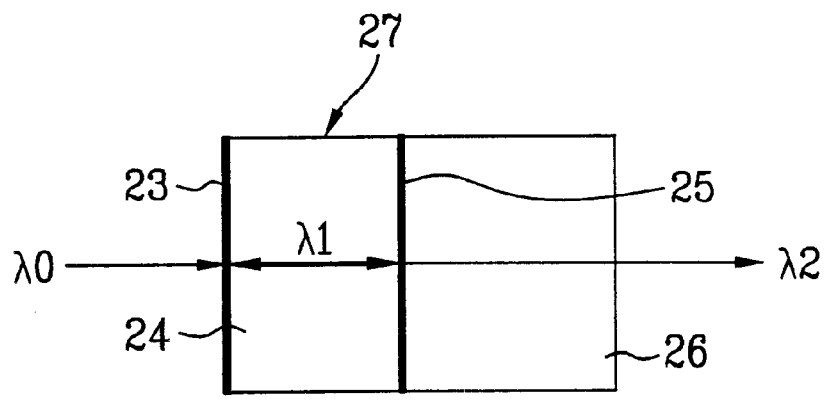
FIGS. 3A–3B illustrate systems and operations of the resonator in the microchip laser in FIG. 2.
Figure 3B:
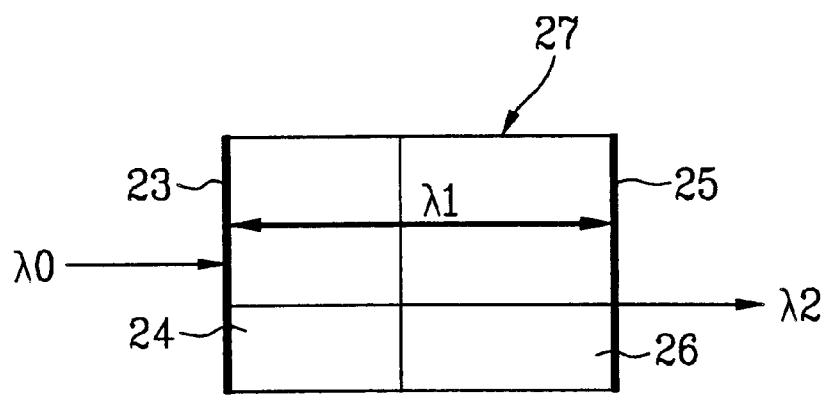
Figure 4A:
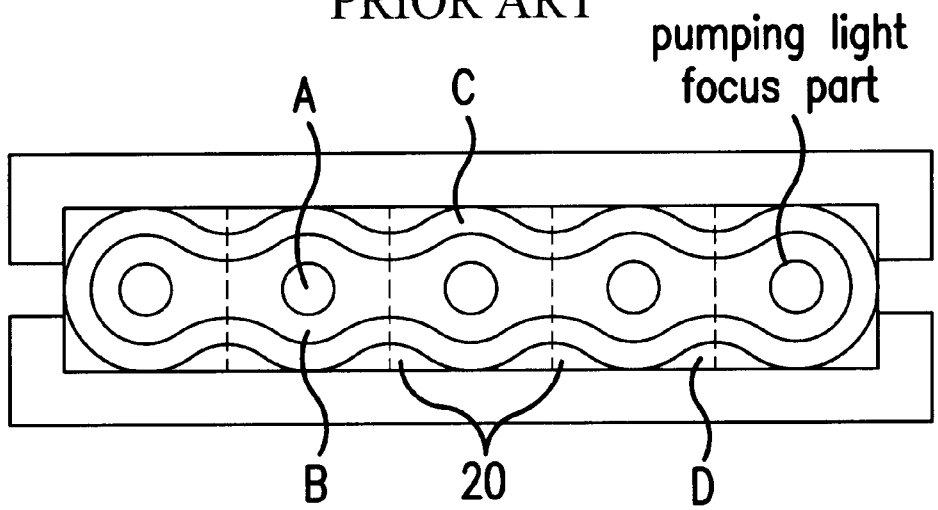
FIGS. 4A and 4B illustrate a temperature distribution at the resonator in an array of the microchip lasers in FIG. 2.
Figure 4B:
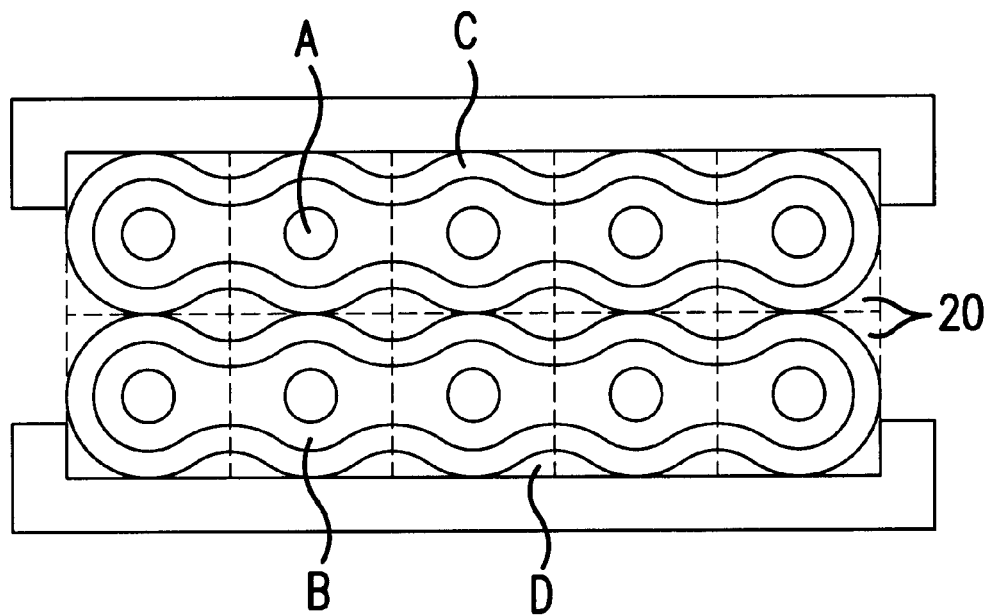

The microchip laser beam shooting part 20 is identical to the microchip laser in FIG. 2. That is, the microchip laser beam shooting part 20 includes a laser diode array 21, a focusing optical system 22, reflectors 23 and 25, a laser medium 24, and nonlinear material 26. The laser medium 24 and the nonlinear material 26 are joined together, and the laser medium 24 has a first reflector 23 and a second reflector 25 coated on opposite surfaces thereof, to form a resonator 27. Of course, in this case too, the first reflector 23 may be coated on one surface of the laser medium 24 and the second reflector 25 may be coated on one surface of the nonlinear material, to form the resonator.

The microchip laser array 100 includes a plurality of microchip laser beam shooting parts 20, for shooting a high powered laser beam. The plurality of microchip laser beam shooting parts 20 may be arranged on one, or more than one line.

The heat transfer member 200 is fitted between, and in contact with, the microchip laser beam shooting parts 20, and formed of a material having a high heat conductivity for transfer of heat generated at the microchip laser beam shooting parts 20 to outside of the high powered laser. The present invention suggests YAG (Yttrium Aluminum Garnet) or sapphire as a material of the heat transfer member 200.

It is preferable that the heat transfer member 200 surrounds the microchip laser array 100 so as to enclose an entire outside surface of the microchip laser beam shooting parts 20.

Further, there are cooling members 300 on outer sides of the heat transfer member 200. The cooling member 300 forcibly cools the heat transfer member 200, for faster cooling of the microchip laser beam shooting parts 20. The cooling member 300 cools by using water or air.

Figure 6A:
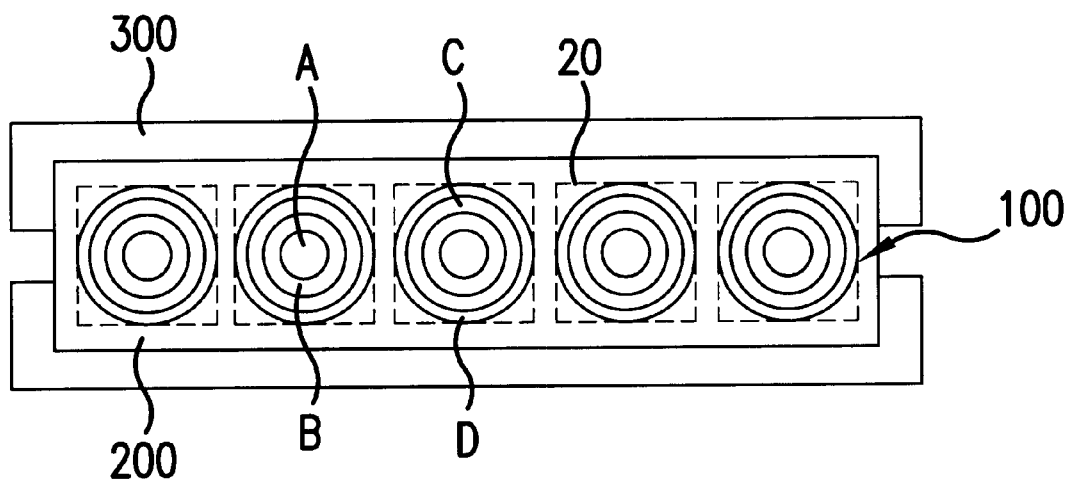
FIGS. 6A and 6B illustrate a temperature distribution at the high powered lasers in FIGS. 5A and 5B.
Figure 6B:
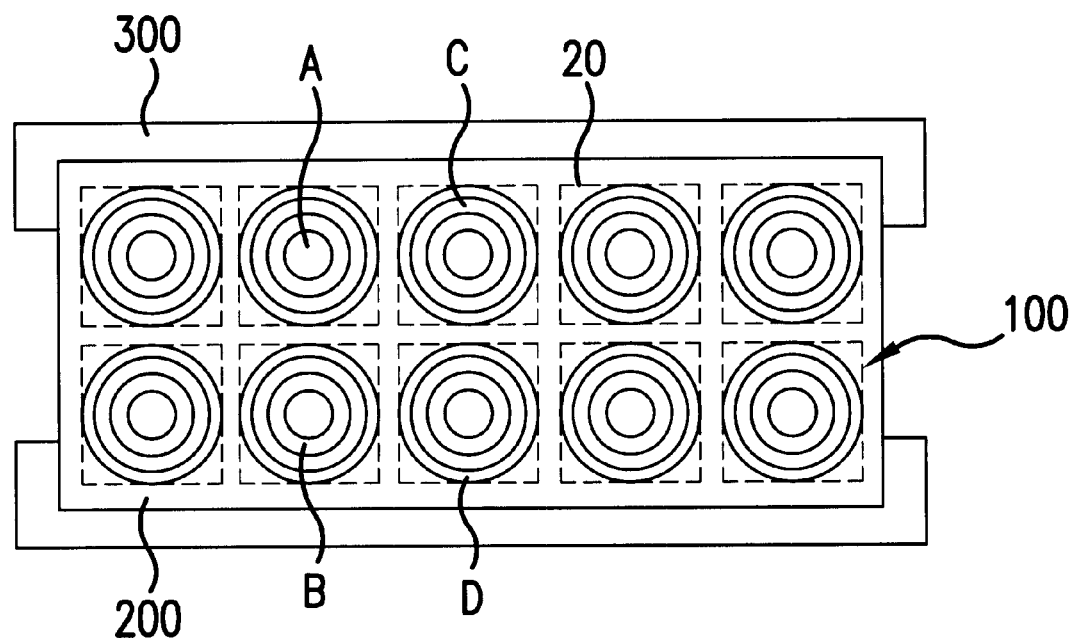

In the foregoing high powered laser, a temperature distribution of the microchip laser array 100 when a laser beam shoots from respective microchip laser beam shooting parts 20 is as shown in FIGS. 6A and 6B.

Referring to FIGS. 6A and 6B, it can be noted that each of the microchip laser beam shooting parts 20 has an independent temperature distribution. That is, there is no temperature distribution crossing a part between adjacent microchip laser beam shooting parts 20 in common. 'A', 'B', 'C', and 'D' show regions of identical temperature, wherein it can be noted that the temperature becomes the lower as it goes further away from 'A' to 'D'.

This is made possible by the provision of the heat transfer member 200 between the microchip laser beam shooting parts 20. Because the heat is absorbed from the microchip laser beam shooting part 20 to the heat transfer member 200 directly, and in turn transferred to the cooling members 300, and discharged therefrom to outside of the high powered laser of the present invention. Therefore, there is no heat interference between adjacent microchip laser beam shooting parts 20.

Thus, the high powered laser of the present invention can enhance an output because the heat generated at the microchip laser beam shooting parts 20 can be discharge quickly to reduce the thermal lens effect, and the laser beam comes from a plurality microchip laser beam shooting parts 20.

Figure 7:
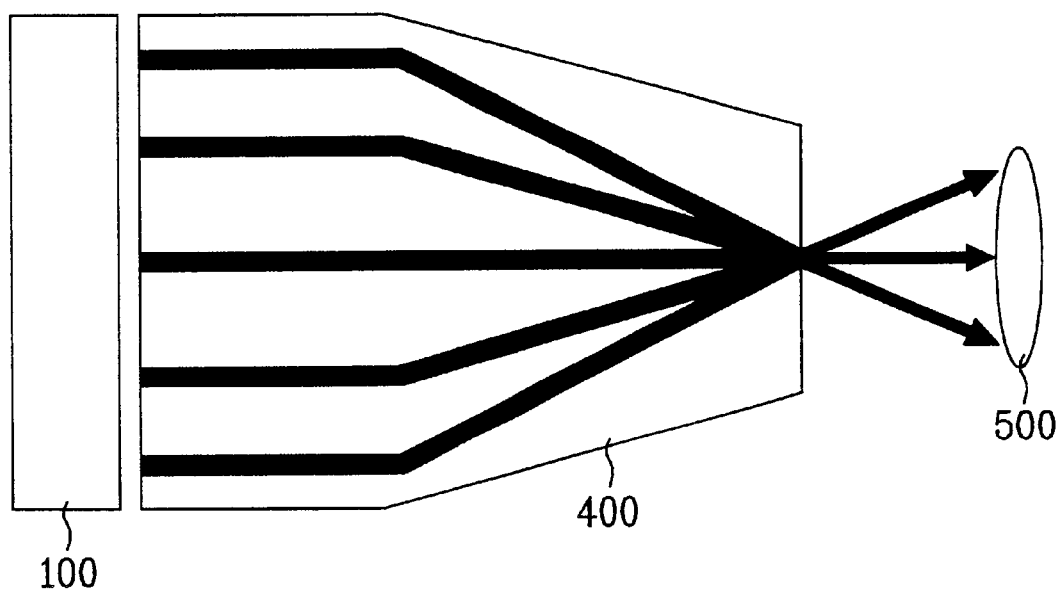
FIG. 7 illustrates a high powered laser in accordance with another preferred embodiment of the present invention, schematically.

Referring to FIG. 7, a high powered laser in accordance with another preferred embodiment of the present invention includes a microchip laser array 100 having a plurality of microchip laser beam shooting parts, and focusing means 400 at an output end of the microchip laser array 100.

Referring to FIGS. 5A and 5B, the microchip laser array 100 includes a heat transfer member 200 for transfer of heat from the microchip laser beam shooters 20 to outside the high powered laser, and a cooling member 300 in contact with the heat transfer member 200 for making forcible cooling down the heat of the heat transfer member 200.

The focusing means 400 focuses lights from the microchip laser beam shooting parts 20 into one laser beam, and a fiber coupler may be employed as the focusing means 400 for focusing the lights from the laser diode array 21.

In this instance, the high powered laser beam from the microchip laser array 100 is focused by the fiber coupler 400, and may be made to be incident to a target by a relay lens 500. Thus, the present invention provides an advantage of employing a high powered laser as a single light source.

As has been explained, the present invention has the following advantages.

First, the joined laser medium 24 and the nonlinear material 26 permits to reduce a whole size and to make an easy alignment of the resonator 27.

Second, the quick discharge of the heat generated at the microchip laser beam shooting parts 20 permits reduction of the thermal lens effect, and the shooting of laser beams from the plurality of microchip laser beam shooting parts 20 permits to provide a high output.

It will be apparent to those skilled in the art that various modifications and variations can be made in the high powered laser of the present invention without departing from the spirit or scope of the invention. Thus, it is intended that the present invention cover the modifications and variations of this invention provided they come within the scope of the appended claims and their equivalents.

What is claimed is:

1. A high powered laser comprising:

a microchip laser array having an array of microchip laser beam shooting parts, each comprising a laser diode, a focusing optical system, and a resonator having a laser medium and nonlinear material;

a heat transfer member of a material with a high thermal conductivity fitted between said laser beam shooting parts, and in contact with top, bottom and side surfaces of each of said microchip laser beam shooting parts, for transferring heat from the microchip laser beam shooting parts to the outside of the high powered laser and;

a cooling member fitted in contact with the heat transfer member for forcible cooling of the heat transferred to the heat transfer member by water or air.

2. The high powered laser as claimed in claim 1, wherein the microchip laser array includes a plurality of the microchip laser beam shooting parts arranged on one line.

3. The high powered laser as claimed in claim 1, wherein the microchip laser array includes a plurality of the microchip laser beam shooting parts arranged on more than one line.

4. The high powered laser as claimed in claim 1, wherein the heat transfer member is formed of YAG(yttrium aluminum garnet), or sapphire.

5. The high powered laser as claimed in claim 1, wherein the heat transfer member surrounds the microchip laser array.

6. A high powered laser comprising:

a microchip laser array having an array of microchip laser beam shooting parts, each comprising a laser diode, a focusing optical system, and a resonator having a laser medium and nonlinear material;

a heat transfer member of a material with a high thermal conductivity fitted between said laser beam shooting parts, and in contact with top, bottom and side surfaces of each of said microchip laser beam shooting parts, for transferring heat from the microchip laser beam shooting parts to outside of the high powered laser;

a cooling member fitted contact with the heat transfer member for forcible cooling of the heat transferred to the heat transfer member by water or air; and focusing means fitted to an output end of the microchip laser array for focusing lights from the microchip laser beam shooting parts into a single laser beam.

7. The high powered laser as claimed in claim 6, wherein the focusing means includes a fiber coupler.

8. The high powered laser as claimed in claim 6, wherein the microchip laser array includes a plurality of the microchip laser beam shooting parts arranged on one, or more than one line.

9. The high powered laser as claimed in claim 6, wherein the heat transfer member is formed of YAG(yttrium aluminum garnet), or sapphire.

10. The high powered laser as claimed in claim 6, wherein the heat transfer member surrounds the microchip laser array.

* * * * *